(12) United States Patent
Kang

(10) Patent No.: US 11,667,307 B2
(45) Date of Patent: Jun. 6, 2023

(54) METHOD AND APPARATUS FOR CONTROLLING AUTONOMOUS DRIVING

(71) Applicants: HYUNDAI MOTOR COMPANY, Seoul (KR); KIA MOTORS CORPORATION, Seoul (KR)

(72) Inventor: Dong Hoon Kang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 254 days.

(21) Appl. No.: 17/095,027

(22) Filed: Nov. 11, 2020

(65) Prior Publication Data

US 2021/0339771 A1 Nov. 4, 2021

(30) Foreign Application Priority Data

Apr. 29, 2020 (KR) ........................ 10-2020-0052406

(51) Int. Cl.
| | | |
|---|---|---|
| B60W 60/00 | (2020.01) | |
| B60W 50/04 | (2006.01) | |
| B60W 40/10 | (2012.01) | |
| B60W 30/02 | (2012.01) | |
| G07C 5/08 | (2006.01) | |
| B60W 40/08 | (2012.01) | |
| B60W 30/18 | (2012.01) | |
| B60W 50/029 | (2012.01) | |

(52) U.S. Cl.
CPC ........ *B60W 60/0025* (2020.02); *B60W 30/02* (2013.01); *B60W 30/18009* (2013.01); *B60W 40/08* (2013.01); *B60W 40/10* (2013.01); *B60W 50/029* (2013.01); *B60W 50/04* (2013.01); *G07C 5/0808* (2013.01); *B60W 2420/42* (2013.01); *B60W 2420/52* (2013.01); *B60W 2510/20* (2013.01); *B60W 2520/10* (2013.01); *B60W 2540/10* (2013.01); *B60W 2540/12* (2013.01); *B60W 2540/225* (2020.02); *B60W 2555/20* (2020.02)

(58) Field of Classification Search
CPC ............ B60W 60/0025; B60W 30/02; B60W 30/18009; B60W 40/08; B60W 40/10; B60W 50/029; B60W 50/04
See application file for complete search history.

(56) References Cited

U.S. PATENT DOCUMENTS

| | | | |
|---|---|---|---|
| 10,053,088 B1 * | 8/2018 | Askeland ............... | B60N 2/002 |
| 11,440,494 B1 * | 9/2022 | Konrardy ............... | G08B 21/02 |
| 2017/0123434 A1 * | 5/2017 | Urano .................... | B60Q 9/008 |
| 2017/0212525 A1 * | 7/2017 | Wang .................... | B60W 50/10 |
| 2018/0099679 A1 * | 4/2018 | Huang .................. | B60W 50/16 |
| 2018/0229701 A1 * | 8/2018 | Tudosie ............... | B60W 10/20 |

(Continued)

*Primary Examiner* — Peter D Nolan
*Assistant Examiner* — Wae L Louie
(74) *Attorney, Agent, or Firm* — Morgan, Lewis & Bockius LLP

(57) ABSTRACT

A method for controlling autonomous driving for an autonomous driving vehicle, includes collecting sensing information on autonomous driving in an autonomous driving mode, calculating an initial longitudinal control value based on the sensing information on the autonomous driving, correcting the initial longitudinal control value based on the sensing information, and performing a longitudinal driving control by transmitting the corrected longitudinal control value to a lower controller.

17 Claims, 7 Drawing Sheets

| AUTOMATION STEP | SAE CLASSIFICATION STANDARD | SYSTEM ROLE | DRIVER ROLE |
|---|---|---|---|
| LEVEL 0 | NO AUTOMATION | TEMPORARILY INVOLVE INTO EMERGENCY SITUATION OR PROVIDE ONLY WARNING | DRIVER PERFORMS ALL DRIVING TYPES |
| LEVEL 1 | DRIVER ASSISTANCE | PERFORM SOME DRIVING FUNCTIONS, SUCH AS STEERING OR ACCELERATION/DECELERATION, TOGETHER WITH DRIVER DRIVING IN NORMAL OPERATION SECTION, ON VEHICLE | DRIVER DETERMINES OPERATION STATE/TIMING OF SYSTEM IN LEVEL 1, PERFORMS OTHER DRIVING FUNCTIONS (INCLUDING DRIVING CONTEXT/VEHICLE DRIVING/MONITORING OF SYSTEM IN LEVEL 1 AND INSTANTLY COPING WITH EMERGENCY SITUATION) EXCEPT FOR MANIPULATING OF STEERING WHEEL OR ACCELERATION/DECELERATION PEDAL |
| LEVEL 2 | PARTIAL AUTOMATION | PERFORM STEERING AND ACCELERATION/DECELERATION IN PLACE OF DRIVER STEERING AND MONITORING ACCELERATION/DECELERATION IN STATE OF THE DRIVER GETS ON VEHICLE | DRIVER DETERMINES OPERATION STATE/TIMING OF SYSTEM, PERFORMS OTHER DRIVING FUNCTIONS (INCLUDING DRIVING CONTEXT/VEHICLE DRIVING/MONITORING OF SYSTEM IN LEVEL 2 AND INSTANTLY COPING WITH EMERGENCY SITUATION) EXCEPT |
| LEVEL 3 | CONDITIONAL AUTOMATION | TRANSFER DRIVING CONTROL TO DRIVER UNDER SITUATION OTHER THAN CONDITION AND PERFORM DRIVING FUNCTION SUCH AS STEERING AND ACCELERATION/DECELERATION | DRIVER DETERMINES OPERATION STATE/TIMING OF SYSTEM, PERFORMS OTHER DRIVING FUNCTIONS (INCLUDING DRIVING CONTEXT/VEHICLE DRIVING/MONITORING OF SYSTEM IN LEVEL 3 AND INSTANTLY COPING WITH EMERGENCY SITUATION) EXCEPT FOR MANIPULATING OF STEERING WHEEL OR ACCELERATION/DECELERATION PEDAL |
| LEVEL 4 | HIGH AUTOMATION | SYSTEM PERFORMS ALL DRIVING FUNCTIONS IN STATE THAT DRIVER GETS ON IN EXTREMELY EXCEPTIONAL CONTEXT | SELECTIVELY PERFORM EMERGENCY SITUATION WHEN SYSTEM IN LEVEL 4 REQUESTS TRANSFERRING CONTROL |
| LEVEL 5 | FULL AUTOMATION | PERFORM FULL DRIVING FUNCTIONS TO COPE WITH ALL CONTEXTS WITHOUT DRIVER | DRIVER DOES NOT PERFORM ALL DRIVING FUNCTIONS EXCEPT FOR DETERMINING OPERATING STATE OF SYSTEM |

(56) References Cited

U.S. PATENT DOCUMENTS

| | | | |
|---|---|---|---|
| 2018/0265076 A1* | 9/2018 | Hall | B60W 10/06 |
| 2019/0143992 A1* | 5/2019 | Sohn | G05D 1/0214 |
| | | | 701/23 |
| 2020/0023859 A1* | 1/2020 | Schmitt | B60W 10/18 |
| 2021/0300430 A1* | 9/2021 | Kang | G06N 20/00 |
| 2021/0339771 A1* | 11/2021 | Kang | B60W 30/18009 |

* cited by examiner

| AUTOMATION STEP | SAE CLASSIFICATION STANDARD | SYSTEM ROLE | DRIVER ROLE |
|---|---|---|---|
| LEVEL 0 | NO AUTOMATION | TEMPORARILY INVOLVE INTO EMERGENCY SITUATION OR PROVIDE ONLY WARNING | DRIVER PERFORMS ALL DRIVING TYPES |
| LEVEL 1 | DRIVER ASSISTANCE | PERFORM SOME DRIVING FUNCTIONS, SUCH AS STEERING OR ACCELERATION/DECELERATION, TOGETHER WITH DRIVER DRIVING IN NORMAL OPERATION SECTION, ON VEHICLE | DRIVER DETERMINES OPERATION STATE/TIMING OF SYSTEM IN LEVEL 1, PERFORMS OTHER DRIVING FUNCTIONS (INCLUDING DRIVING CONTEXT/VEHICLE DRIVING/MONITORING OF SYSTEM IN LEVEL 1 AND INSTANTLY COPING WITH EMERGENCY SITUATION) EXCEPT FOR MANIPULATING OF STEERING WHEEL OR ACCELERATION/DECELERATION PEDAL |
| LEVEL 2 | PARTIAL AUTOMATION | PERFORM STEERING AND ACCELERATION/DECELERATION IN PLACE OF DRIVER STEERING AND ACCELERATION/DECELERATION IN STATE OF THE DRIVER GETS ON VEHICLE | DRIVER DETERMINES OPERATION STATE/TIMING OF SYSTEM, PERFORMS OTHER DRIVING FUNCTIONS (INCLUDING DRIVING CONTEXT/VEHICLE DRIVING/MONITORING OF SYSTEM IN LEVEL 2 AND INSTANTLY COPING WITH EMERGENCY SITUATION) EXCEPT |
| LEVEL 3 | CONDITIONAL AUTOMATION | TRANSFER DRIVING CONTROL TO DRIVER UNDER SITUATION OTHER THAN CONDITION AND PERFORM DRIVING FUNCTION SUCH AS STEERING AND ACCELERATION/DECELERATION | DRIVER DETERMINES OPERATION STATE/TIMING OF SYSTEM, PERFORMS OTHER DRIVING FUNCTIONS (INCLUDING DRIVING CONTEXT/VEHICLE DRIVING/MONITORING OF SYSTEM IN LEVEL 3 AND INSTANTLY COPING WITH EMERGENCY SITUATION) EXCEPT FOR MANIPULATING OF STEERING WHEEL OR ACCELERATION/DECELERATION PEDAL |
| LEVEL 4 | HIGH AUTOMATION | SYSTEM PERFORMS ALL DRIVING FUNCTIONS IN STATE THAT DRIVER GETS ON IN EXTREMELY EXCEPTIONAL CONTEXT | SELECTIVELY PERFORM EMERGENCY SITUATION WHEN SYSTEM IN LEVEL 4 REQUESTS TRANSFERRING CONTROL |
| LEVEL 5 | FULL AUTOMATION | PERFORM FULL DRIVING FUNCTIONS TO COPE WITH ALL CONTEXTS WITHOUT DRIVER | DRIVER DOES NOT PERFORM ALL DRIVING FUNCTIONS EXCEPT FOR DETERMINING OPERATING STATE OF SYSTEM |

Fig.1

METHOD AND APPARATUS FOR CONTROLLING AUTONOMOUS DRIVING

CROSS-REFERENCE TO RELATED APPLICATION

This application claims priority to and the benefit of Korean Patent Application No. 10-2020-0052406, filed on Apr. 29, 2020, the entire contents of which are incorporated herein by reference.

TECHNICAL FIELD

The present disclosure relates to controlling an autonomous driving vehicle.

BACKGROUND

An autonomous driving vehicle requires an ability to adaptively cope with a surrounding situation varying in real time during driving.

To mass-produce and activate an autonomous driving vehicle, a reliable determination control function is required above all.

A commercial vehicle, such as a large truck, may be driven alone, but may be operated with trailers which are attached thereto and having various sizes.

The large truck is changed in length and weight of a vehicle body depending on whether the trailer is attached to the large truck.

The large truck having the trailer attached thereto receives vehicle inertia and an influence by slip greater than those of a typical sedan. Accordingly, when a longitudinal control strategy applied to the typical sedan is applied to a commercial vehicle without change, it may be difficult to perform the optimal longitudinal control appropriate to the characteristic of the commercial vehicle.

SUMMARY

An aspect of the present disclosure provides a method and an apparatus for controlling autonomous driving.

Another aspect of the present disclosure provides a method and an apparatus for controlling autonomous driving, capable of performing longitudinal control.

Another aspect of the present disclosure provides a method and an apparatus for controlling autonomous driving, capable of improving longitudinal control tracking performance by generating a longitudinal control requirement value error-corrected, based on surrounding environment information and vehicle body information which are obtained through various sensors provided in an autonomous driving vehicle to transmit the longitudinal control requirement value to a lower controller.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a method for controlling autonomous driving for an autonomous driving vehicle may include collecting sensing information on autonomous driving in an autonomous driving mode, calculating an initial longitudinal control value based on the sensing information on the autonomous driving, correcting the initial longitudinal control value based on the sensing information of the autonomous driving, and performing a longitudinal driving control by transmitting the corrected longitudinal control value to a lower controller.

According to an embodiment, the correcting of the initial longitudinal control value based on the sensing information of the autonomous driving may include activating a controller correcting parameter based on an input or output error of the lower controller.

According to an embodiment, the activating of the controller correcting parameter based on the input or output error of the lower controller may include measuring the input or output error between a required acceleration and an output acceleration for the lower controller, comparing between the input or output error and a critical error, and activating the controller correcting parameter to maintain tracking performance to be within a range of the critical error, when the input or output error exceeds the critical error, as the comparison result.

According to an embodiment, the correcting of the initial longitudinal control value based on the sensing information of the autonomous driving may include determining a trailer correcting parameter based on whether a trailer is attached to the autonomous driving vehicle.

According to an embodiment, the determining of the trailer correcting parameter based on whether the trailer is attached to the autonomous driving vehicle may include determining whether the trailer is attached, by analyzing the sensing information on the autonomous driving, calculating a specification of the trailer based on the sensing information on the autonomous driving, when the trailer is attached, depending on the determination result, and determining the trailer correcting parameter corresponding to the calculated specification of the trailer by making reference to a trailer mapping table which is previously stored.

According to an embodiment, the correcting of the initial longitudinal control value based on the sensing information of the autonomous driving may include determining a driving context correcting parameter corresponding to a driving context.

According to an embodiment, the determining of the driving context correcting parameter corresponding to the driving context may include determining the driving context based on the sensing information on the autonomous driving, determining whether application of a longitudinal control parameter is required with respect to the determined driving context, and determining the driving context correcting parameter, which corresponds to a characteristic of the autonomous driving vehicle and the determined driving context, by making reference to a driving context mapping table which is previously stored, when the application of the longitudinal control parameter is required as the determination result.

According to an embodiment, the characteristic of the autonomous driving vehicle may include acceleration tracking performance for each vehicle speed based on slip and behavior limits.

According to an embodiment, the corrected control value may be calculated by applying at least one of the controller correcting parameter, the trailer correcting parameter, or the driving context correcting parameter to the initial longitudinal control value.

According to an embodiment, the sensing information on the autonomous driving may include at least one of positioning information, precision map information, camera capturing information, sensing information by a Radar or or Lidar, weather information, driving speed information, information on a recognized driver gaze, sensing information on vehicle internal failure, information on a button input to release the autonomous driving, sensing information on an operation of a steering wheel, or sensing information on an operation of the acceleration or deceleration pedal.

According to another aspect of the present disclosure, an apparatus for controlling autonomous driving, which includes various sensors, may include a sensing part to collect sensing information on autonomous driving in an autonomous driving mode, a longitudinal control value generator to calculate an initial longitudinal control value based on the sensing information on the autonomous driving, a longitudinal control parameter corrector to calculate the initial longitudinal control value based on the sensing information of the autonomous driving, and a lower controller to control longitudinal driving by receiving the corrected longitudinal control value.

According to an embodiment, the longitudinal control parameter corrector may include an input or output error correcting part to activate a controller correcting parameter based on an input or output error of the lower controller.

According to an embodiment, the input or output error correcting part may include measure the input or output error between a required acceleration and an output acceleration for the lower controller, compare between the input or output error and a critical error, and activate the controller correcting parameter to maintain tracking performance to be within a range of the critical error, when the input or output error exceeds the critical error.

According to an embodiment, the longitudinal control parameter corrector may include a first parameter correction part to determine a trailer correcting parameter based on whether a trailer is attached to the autonomous driving vehicle.

According to an embodiment, the first parameter correction part may determine whether the trailer is attached, by analyzing the sensing information on the autonomous driving, calculate a specification of the trailer based on the sensing information on the autonomous driving, when the trailer is attached, and determine the trailer correcting parameter corresponding to the calculated specification of the trailer by making reference to a trailer mapping table which is previously stored.

According to an embodiment, the longitudinal control parameter corrector may include a second parameter correction part to determine a driving context correcting parameter corresponding to a driving context.

According to an embodiment, the second parameter correction part may determine the driving context based on the sensing information on the autonomous driving, determine whether application of a longitudinal control parameter is required with respect to the determined driving context, and determine the driving context correcting parameter, which corresponds to a characteristic of the autonomous driving vehicle and the determined driving context, by making reference to a driving context mapping table which is previously stored, when the application of the longitudinal control parameter is required.

According to an embodiment, the characteristic of the autonomous driving vehicle may include acceleration tracking performance for each vehicle speed based on slip and behavior limits.

According to an embodiment, the corrected control value may be calculated by applying at least one of the controller correcting parameter, the trailer correcting parameter, or the driving context correcting parameter to the initial longitudinal control value.

According to an embodiment, the sensing information on the autonomous driving may include at least one of positioning information, precision map information, camera capturing information, sensing information by a Radar or Lidar, weather information, driving speed information, information on a recognized driver gaze, sensing information on vehicle internal failure, information on a button input to release the autonomous driving, sensing information on an operation of a steering wheel, or sensing information on an operation of an acceleration or deceleration pedal.

The technical problems to be solved by the present disclosure are not limited to the aforementioned problems, and any other technical problems not mentioned herein will be clearly understood from the following description by those skilled in the art to which the present disclosure pertains.

The present disclosure provides a method and an apparatus for controlling autonomous driving.

In addition, the present disclosure provides a method and an apparatus for controlling autonomous driving, capable of performing longitudinal control optimized in a commercial vehicle.

Further, the present disclosure provides a method and an apparatus for controlling autonomous driving, capable of improving longitudinal control tracking performance by generating a longitudinal control requirement value, the error of which is corrected based on surrounding environment information and vehicle body information which are obtained through various sensors provided in an autonomous driving vehicle to transmit the longitudinal control requirement value to a lower controller.

In addition, according to the present disclosure, the legal conflict caused by the autonomous driving accident may be previously prevented through the strategy to optimize the longitudinal control tracking performance.

Further, according to the present disclosure, the longitudinal autonomous driving performance of the commercial vehicle corresponding to level 3 may be improved.

In addition, according to the present disclosure, a longitudinal control correcting parameter is adaptively applied through the parameter mapping table based on various vehicle specifications and various driving contexts, thereby improving the longitudinal control tracking performance and minimizing maintenance cost.

Besides, a variety of effects directly or indirectly understood through the disclosure may be provided.

DRAWINGS

In order that the disclosure may be well understood, there will now be described various forms thereof, given by way of example, reference being made to the accompanying drawings, in which:

FIG. 1 is a table having defined autonomous levels of an autonomous driving vehicle, in one form of the present disclosure;

DETAILED DESCRIPTION

Figure 2:
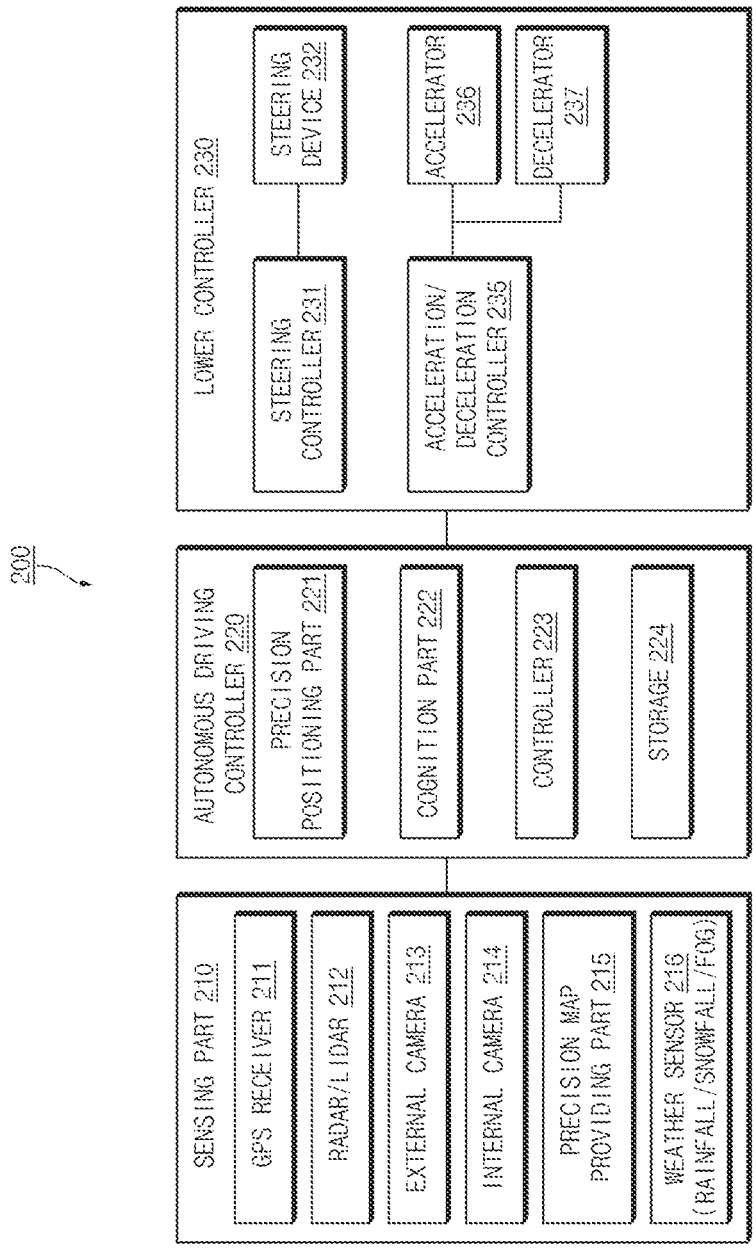
FIG. 2 is a block diagram illustrating the structure of an apparatus for controlling autonomous driving, in one form of the present disclosure.

Hereinafter, some embodiments of the present disclosure will be described in detail with reference to accompanying drawings. In adding the reference numerals to the components of each drawing, it should be noted that the identical or equivalent component is designated by the identical numeral even when they are displayed on other drawings. In addition, in the following description of an embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the tams do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described with reference to FIGS. 1 to 7.

FIG. 1 is a table having defined autonomous levels of an autonomous driving vehicle, according to an embodiment of the present disclosure.

The autonomous driving vehicle refers to a self-driving vehicle to recognize a driving environment for itself to determine dangerousness, and controlling a driving route while minimizing the driving operation by the driver.

Finally, the autonomous driving vehicle refers to a vehicle that is able to perform driving, controlling, and parking without the influence by a person. The autonomous driving vehicle are focused on a vehicle advanced in an autonomous driving technology, which is the core of the autonomous driving vehicle and indicates an ability to operate the vehicle without the active control or monitoring of the driver.

However, the present concept of the autonomous driving vehicle may include an automation level (autonomous driving level) in the intermediate level, as illustrated in FIG. 1, aiming at full automation vehicle, and may correspond to a target-oriented concept for mass-production and commercialization of a full autonomous vehicle.

According to the present disclosure, a method for controlling autonomous driving is applicable to the autonomous driving vehicle corresponding to level 3 (conditional automation) among automation levels illustrated in FIG. 1, but is not limited thereto. For example, the method for controlling the autonomous driving is applicable to an autonomous driving vehicle in all levels having a situation of transferring control.

The automation level of the autonomous driving vehicle based on the American Society of Automotive Engineers is classified from level 0 to level 5.

The automation in level 3 allows control transfer between a human and a system during the driving, which is different from the automation in level 4 or more, thereby causing more complicated problems as compared to full automation.

The automation in level 3 does not require looking forward and vehicle controlling of the driver in the autonomous driving mode, but requires that the driver has to always read to drive, which is different from level 4 or more allowing a system to be in charge of the full procedure of driving.

In addition, the automation in level 3 is possible only in Operational Design Domain (ODD), which refers to a situation having specific restrictions in, for example, weather, road, or communication. Accordingly, the switching to the manual driving mode has to be performed in other cases except for the ODD. In other words, the driver has to retrieve controller when a vehicle becomes out of the ODD state during travelling in the autonomous driving mode.

When an accident (hereinafter, referred to as an "autonomous driving accident") occurs while an autonomous driving vehicle is travelling in the autonomous driving mode in the ODD state, problems related to responsibility for an accident unique to the autonomous driving vehicle may be caused. Accordingly, an effort to previously prevent the autonomous driving accident is required.

In particular, improved vehicle control is required in the ODD state in which Highway Driving Pilot (HDP), which is the autonomous driving technology in level 3 regarded as "Highway autonomous driving" is possible.

FIG. 2 is a block diagram illustrating the structure of an apparatus (autonomous driving control apparatus) for controlling autonomous driving, according to an embodiment of the present disclosure.

Referring to FIG. 2, an autonomous driving control apparatus 200 may mainly include a sensing part 210, an autonomous driving controller 220, and a lower controller 230.

The sensing part 210 may include a GPS receiver 211, a Radar or Lidar 212, an external camera 213, an internal camera 214, a precision map providing part 215, and a weather sensor 216.

The autonomous driving controller 220 may include a precision positioning part 221, a cognition part 222, a controller 223, and a storage 224.

The lower controller 230 may include a steering controller 231, a steering device 232, an acceleration or deceleration controller 235, an accelerator 236, and a decelerator 237.

The components of the autonomous driving control apparatus 200, which are illustrated in FIG. 2, may not be essential components, and include more or less components.

The GPS receiver 211 may receive a positioning signal from a positioning satellite. In this case, the positioning signal may be used to generate geographic position information of a vehicle.

The Radar or Lidar 212 may sense a surrounding object of the vehicle.

The Radar or Lidar 212 may be used to detect an object in front, side, and rear of the vehicle, calculate the distance to the detected object, determine whether the detected object is a static object or a dynamic object, measure a moving speed of the detected dynamic object, determine whether the detected dynamic object is a pedestrian or a vehicle, and identify the condition of roads and facilities through high-resolution terrain scan.

The external camera 213 may be mounted outside the vehicle to photograph an image of the front, side, or rear portion of the vehicle. To this end, a plurality of external cameras 213 may be provided in the vehicle. The image photographed by the internal camera 214 may be used to identify a line of a vehicle, identify an object surrounding the vehicle, OR realize augmented reality, but is not limited thereto. The image may be used to determine whether a trailer is mounted.

The internal camera 214 is mounted at one side of the indoor of the vehicle to photograph the appearance of a driver.

The image photographed by the internal camera 214, may be used to monitor the gaze direction of the driver or the drowsiness of the driver.

The precision map providing part 215 may provide a precision map depending on the request of the autonomous driving controller 220.

The weather sensor 216 may sense rainfall, snowfall, fog, a temperature, and moisture.

The precision positioning part 221 may determine a present position of the vehicle by using the positioning signal from the GPS receiver 201 and the precision map information obtained from the precision map providing part 215, and may map the determined present position of the vehicle onto the precision map.

The cognition part 222 may recognize a lane based on sensing information from the Radar or Lidar 212 and image information captured by the external camera 213, and may identify a vehicle travelling around a host vehicle, or an obstacle or pedestrian around the host vehicle.

In addition, the cognition part 222 may determine whether the trailer is mounted, based on the sensing information from the Radar or Lidar 212 and image information photographed by the external camera 213.

In addition, the cognition part 222 may determine the driving context based on the sensing information collected from the sensing part 210.

For example, the driving context may include, but is not limited to, a driving route context, a driving road context, a weather context, or a road context.

The driving route context may include, but is not limited to, driving contexts on a straight route, a turning route, an uphill, or a downhill.

The driving context situation may include, but is not limited to, a smooth context, a delay context, a congestion context.

The weather context may include, but is not limited to, a sunny context, a rainfall context, a snowfall context, or a fog context.

A road surface context may include, but is not limited to, an asphalt road, a concrete road, or an unpaved road.

The controller 223 may calculate a required command value, based on the position information of the vehicle, which is mapped to the precision map, and various cognition results of the cognition part 222, and transmit the calculated required command value to the lower controller 230.

For example, the required command value may include a longitudinal control requirement value and a lateral control requirement value.

The longitudinal control requirement value and the lateral control requirement value are transmitted to the acceleration or deceleration controller 235 and the steering controller 231 to perform behavior control in a longitudinal direction and behavior control in a lateral direction.

The controller 223 may determine whether control needs to be transferred from the system to the driver, based on internal and external states of the vehicle depending on the cognition result of the cognition part 222, and whether the driver inputs a button to release autonomous driving.

The controller 223 may perform a control operation to output a specific warning notification for requesting for transferring the control to the driver, when the control needs to be transferred to the driver.

The storage 224 may record software for the operation of the autonomous driving controller 220.

The storage 224 may maintain various mapping tables for determining a longitudinal control parameter.

For example, the longitudinal control parameter may include a trailer correcting parameter $P_{trail}$ to be described later and a surrounding context correcting parameter $P_{env}$.

The controller 223 may generate and correct the longitudinal control requirement value based on the driving context and the attachment state of the trailer, which are identified by the cognition part 222.

The steering controller 231 is a controller which is in charge of the lateral-direction behavior of the autonomous driving vehicle. The steering controller 231 may control the steering device 232 based on the lateral control requirement value transmitted from the controller 223 of the autonomous driving controller 220.

In this case, the steering device 232 may include an actuator for the lateral-directional behavior.

The acceleration or deceleration controller 235 may control the longitudinal behavior, which is a driving acceleration of the autonomous driving vehicle, depending on the required command of the controller 223.

The acceleration or deceleration controller 235 may control the longitudinal-direction behavior of the autonomous driving vehicle by controlling an accelerator 236 and (or) a decelerator 237 depending on the longitudinal control requirement value transmitted from the controller 223 of the autonomous driving controller 220. As an example, the accelerator 236 includes a throttle or an accelerator, and the decelerator 237 may include a brake to reduce the speed of the vehicle.

In this case, the throttle may control the operating speed and acceleration of the engine and or the motor provided in the vehicle.

Figure 3:
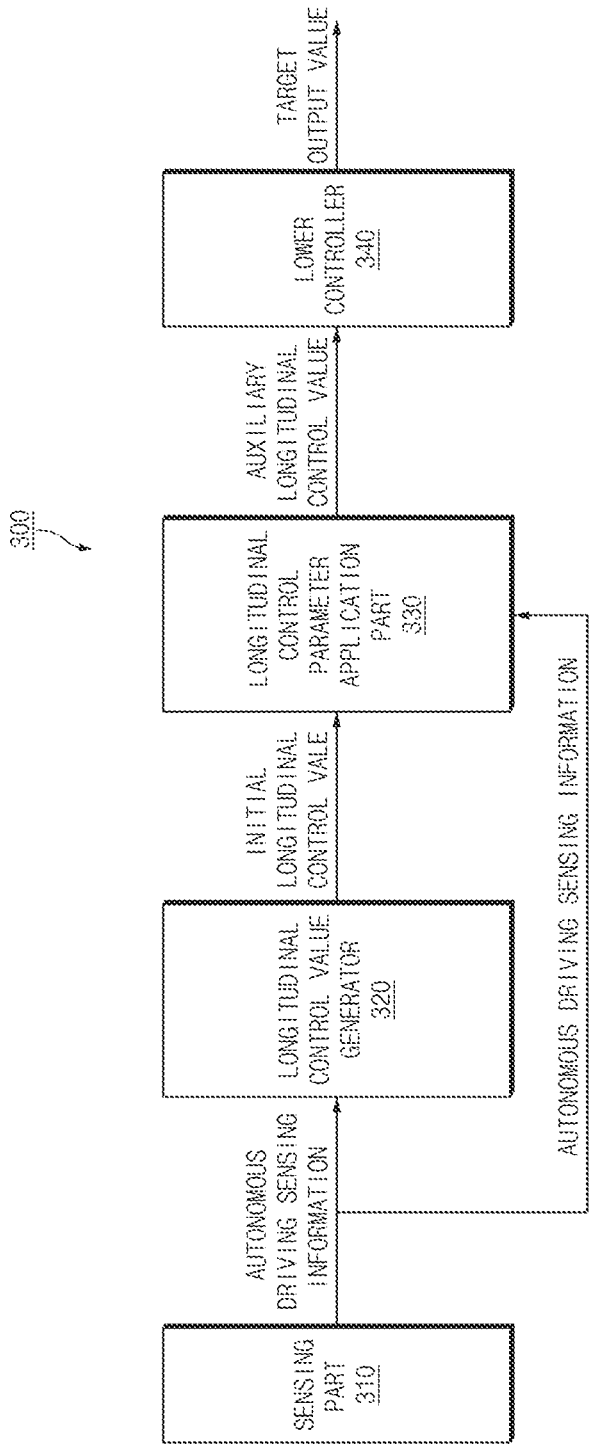
FIG. 3 is a block diagram illustrating the structure of an autonomous driving control apparatus, in one form of the present disclosure.

FIG. 3 is a block diagram illustrating the structure of an autonomous driving control apparatus, according to another embodiment of the present disclosure.

Referring to FIG. 3, an autonomous driving control apparatus 300 may include a sensing part 310, a longitudinal control value generator 320, a longitudinal control parameter application part 330, and a lower controller 340.

The sensing part 310 may include various sensors for autonomous driving and may generate sensing information on the autonomous driving, based on sensing information collected from the sensors.

The sensing information on the autonomous driving may include positioning information, precision map information, camera capturing information, the sensing information by the Radar or Lidar, weather information, driving speed information, information on the recognized driver gaze, sensing information on vehicle internal failure, information on a button input to release the autonomous driving, sensing information on the operation of the steering wheel, or the sensing information on the operation of the acceleration or deceleration pedal, but is not limited thereto.

The longitudinal control value generator 320 may generate an initial longitudinal control value "a_raw" based on the sensing information on the autonomous driving.

The longitudinal control parameter application part 330 may determine a correcting parameter based on the sensing information on the autonomous driving when receiving an initial longitudinal control value generated from the longitudinal control value generator 320, and may generate a corrected lateral control value by applying the determined correcting parameter to the initial longitudinal control value.

The lower controller 340 may generate a target output value by receiving the corrected lateral control value from the longitudinal control parameter application part 330. In other words, the lower controller 340 may control the longitudinal driving of the vehicle by controlling the accelerator and (or) the decelerator based on the corrected lateral control value.

The detailed structure and the operation of the longitudinal control parameter application part 330 will be more apparently understood from the description made with reference to FIGS. 4 to 7.

Figure 4:
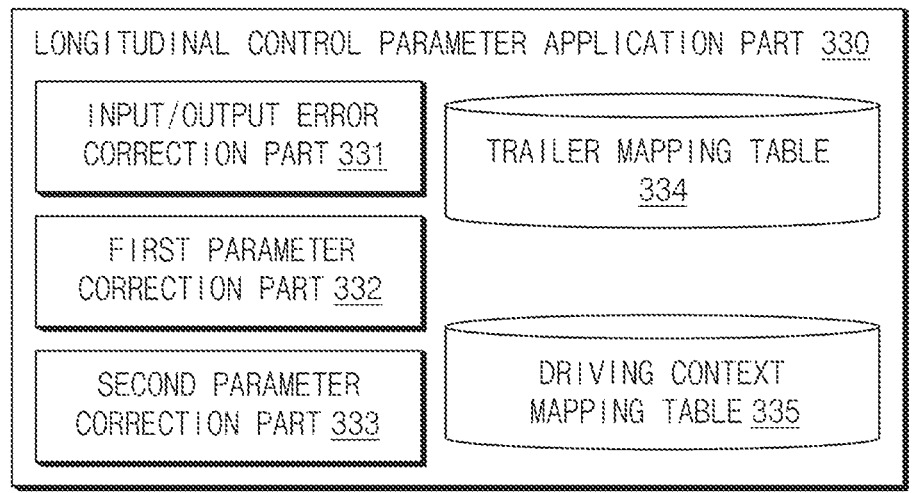
FIG. 4 is a block diagram illustrating the structure of a longitudinal control parameter application part, in one form of the present disclosure.

FIG. 4 is a block diagram illustrating the structure of a longitudinal control parameter application part, according to an embodiment of the present disclosure.

Referring to FIG. 4, the longitudinal control parameter application part 330 may include an input or output error correcting part 331, a first parameter correcting part 332, a second parameter correcting part 333, a trailer mapping table 334, and a driving situation mapping table 335.

The input or output error correcting part 331 may monitor an input or output error of the lower controller 340. When the input or output error exceeds a reference value, the input or output error correcting part 331 may activate a controller correcting parameter $P_{hw}$ such that the input or output error falls within a specific allowance range.

The first parameter correcting part 332 may determine whether the trailer is mounted in the vehicle, based on the sensing information on the autonomous driving.

In addition, the first parameter correcting part 332 may determine the specification of the trailer when the mounting of the trailer is identified.

The first parameter correcting part 332 may determine a trailer correcting parameter $P_{trail}$ corresponding to the determined specification of the trailer, by making reference to a trailer mapping table 334 stored in the inner memory (not illustrated).

The second parameter correcting part 333 may determine the driving context of the vehicle, based on the sensing information on the autonomous driving.

The second parameter correcting part 333 may determine whether the determined driving context is a context to require the application of the longitudinal control parameter.

When the application of the longitudinal control parameter is required, the second parameter correcting part 333 may extract, from a driving context mapping table 335, the acceleration tracking performance for each vehicle speed based on the characteristics of the vehicle, which are, for example, slip and behavior limits, and the driving context correcting parameter $P_{env}$ corresponding to the determined driving context.

Figure 5:
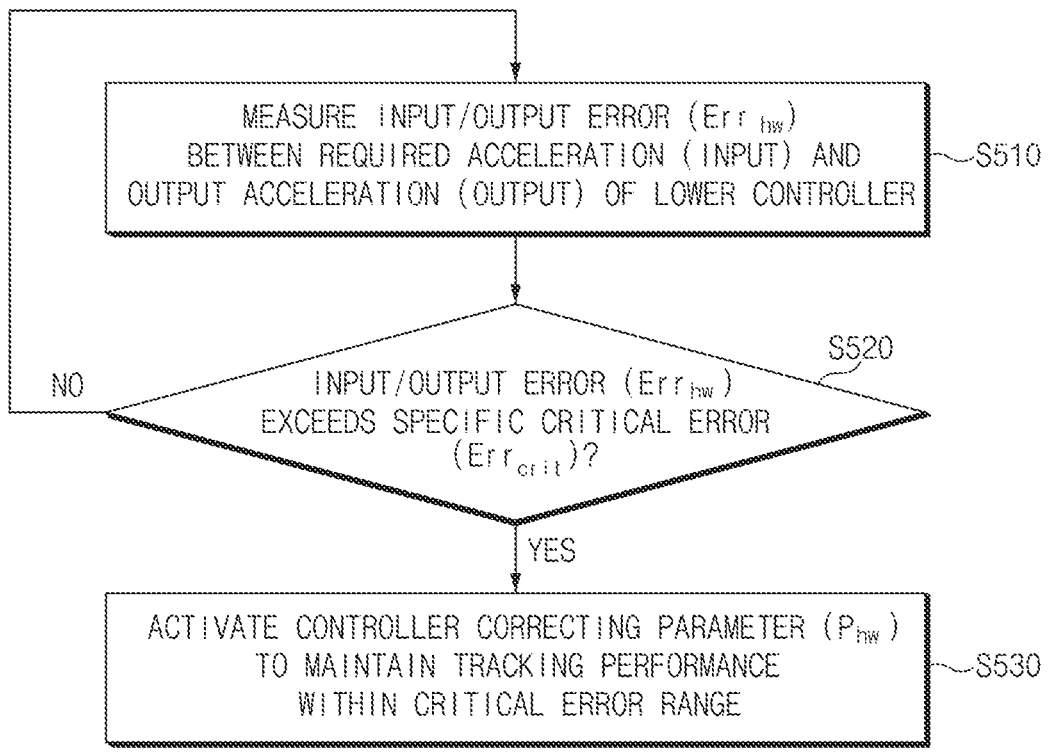
FIG. 5 is a flowchart illustrating a method for controlling autonomous driving, in one form of the present disclosure.

FIG. 5 is a flowchart illustrating a method for controlling autonomous driving, according to an embodiment of the present disclosure.

In detail, FIG. 5 is a flowchart illustrating a method for controlling autonomous driving by the input or output error correcting part 331 of the longitudinal control parameter application part 330.

Referring to FIG. 5, the input or output error correcting part 331 may measure an input or output error $Err_{hw}$ between a required acceleration (input) and an output acceleration (output) of the lower controller (S510).

The input or output error correcting part 331 may determine whether the measured input or output error exceeds a specific critical error $Err_{crit}$ (S520).

When the input or output error exceeds the critical error as the determination result, the input or output error correcting part 331 may activate a controller correcting parameter $P_{hw}$ to maintain the tracking performance within a critical error range (S530).

The input or output error correcting part 331 may activate a controller correcting parameter $P_{hw}$ such that the output acceleration of the lower controller 340 tracks a required acceleration, when the error between the required acceleration (input) and the acceleration (output) of the lower controller 340 of the vehicle is sensed to be greater than a reference value.

For example, when a driver applies a brake input, and when the lower controller 340 outputs decelerating force lower than required decelerating force, the input or output error correcting part 331 may activate the controller correcting parameter $P_{hw}$ such that the deceleration input value is increased to be in a specific level.

Figure 6:
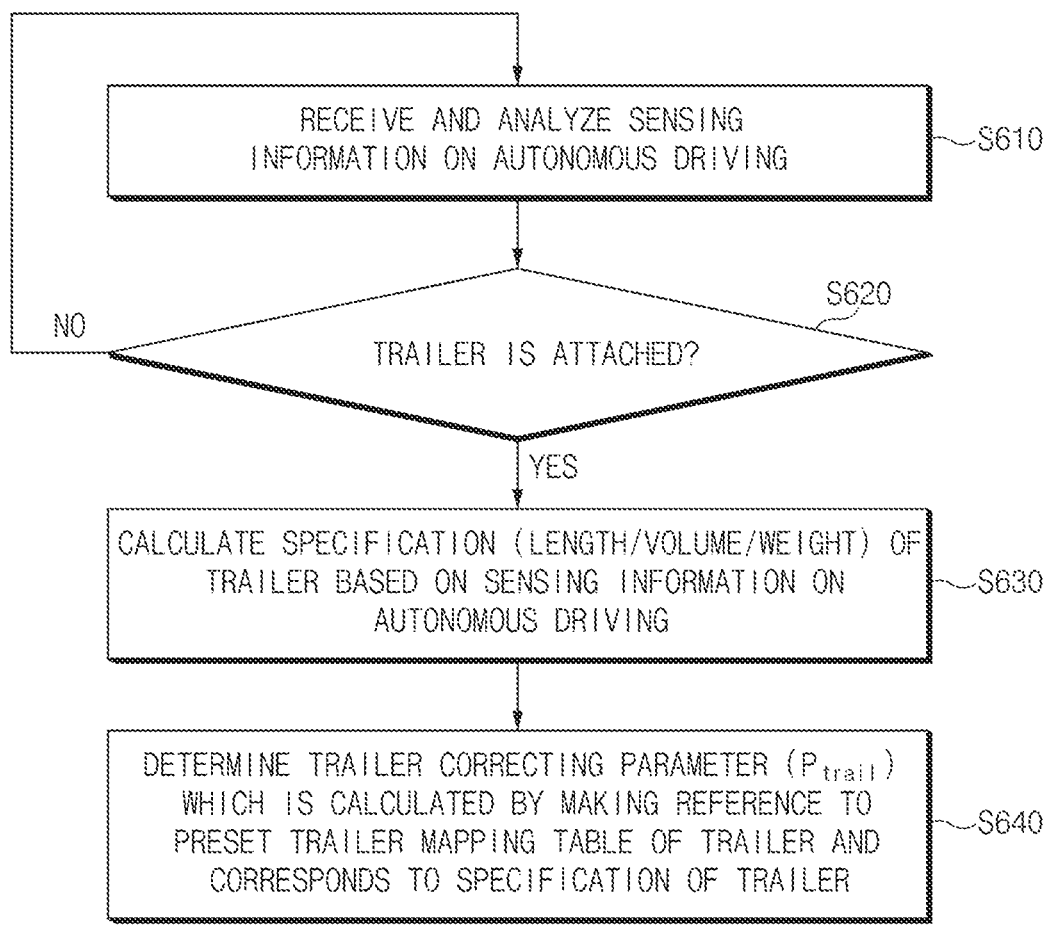
FIG. 6 is a block diagram illustrating a method for controlling autonomous driving, in one form of the present disclosure.

FIG. 6 is a block diagram illustrating a method for controlling autonomous driving, according to another embodiment of the present disclosure.

In detail, FIG. 6 is a flowchart illustrating the method for controlling autonomous driving by the input or output error correcting part 332 of the longitudinal control parameter application part 330.

Referring to FIG. 6, the first parameter correcting part 332 may receive and analyze autonomous driving sensing information from the sensing part 310 (S610).

The first parameter correcting part 332 may determine whether the trailer is attached to the vehicle, based on the analysis result of the autonomous driving sensing information (S620).

When the trailer is attached as the determination result, the first parameter correcting part 332 may calculate the specification of the trailer based on the sensing information on the autonomous driving (S630). In this case, the specification of the trailer may include information on the length, the volume, and the weight of the trailer, but is not limited thereto. For example, the specification of the trailer may include the shape and the type of the trailer.

The first parameter correcting part 332 may determine a trailer correcting parameter $P_{trail}$ which is calculated by making reference to a preset mapping table of the trailer and corresponds to the specification of the trailer (S640).

The trailer mapping table may have the trailer correcting parameter $P_{trail}$ corresponding to the specification of the trailer and previously defined.

When the trailer is attached to the vehicle, the vehicle specification is changed, and the acceleration control error may occur due to the change in the vehicle specification.

The present disclosure may more exactly perform the longitudinal control by correcting the acceleration control error resulting from the attaching of the trailer, based on the trailer correcting parameter "$P_{trail}$".

Figure 7:
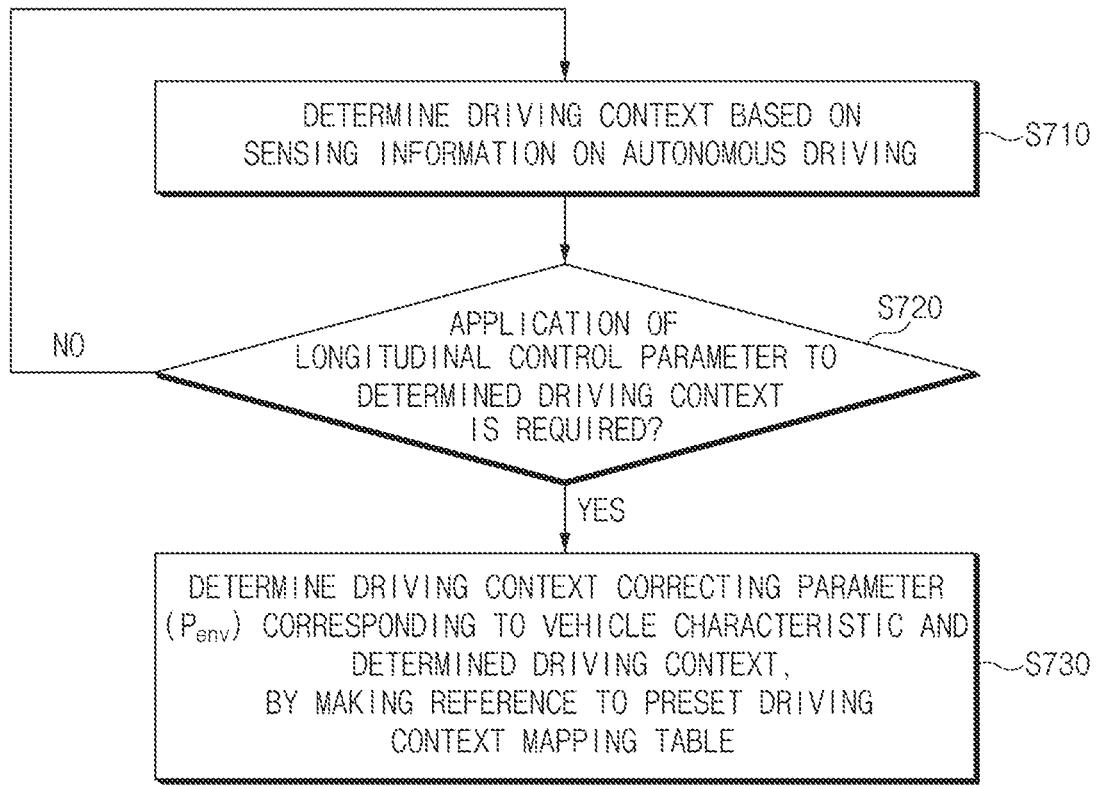
FIG. 7 is a block diagram illustrating a method for controlling autonomous driving, in one form of the present disclosure.

FIG. 7 is a block diagram illustrating a method for controlling autonomous driving, according to another embodiment of the present disclosure.

In detail, FIG. 7 is a flowchart illustrating a method for controlling autonomous driving by the second parameter correcting part 333 of the longitudinal control parameter application part 330.

Referring to FIG. 7, the second parameter correcting part 333 may receive the sensing information of the autonomous driving from the sensing part 310 to determine the driving context (S710).

The second parameter correcting part 333 may determine whether the application of the longitudinal control parameter to the determined driving context is required (S720).

When the application of the longitudinal control parameter is required as the determination result, the second parameter correcting part 333 may determine the driving context correcting parameter $P_{env}$ corresponding to the vehicle characteristic and the determined driving context, by making reference to the preset driving context mapping table (S730).

For example, the driving context may include, but is not limited to, a driving route context, a driving road context, a weather context, or a road surface context.

The driving route context may include, but is not limited to, driving contexts on a straight route, a turning route, or an uphill.

The driving road context may include, but is not limited to, a smooth context, a delay context, a congestion context.

The weather context may include a sunny context, a rainfall context, a snowfall context, a fog context or a strong wind context, but is not limited thereto.

The road surface context may include, but is not limited to, an asphalt road, a concrete road, or an unpaved road.

According to an embodiment, the second parameter correcting part 333 may extract the driving context correcting parameter $P_{env}$ from the preset driving context mapping table, based on an acceleration tracking performance for each vehicle speed and the determined driving context by considering the characteristics of the commercial vehicle, which are, for example, slip and behavior limits.

According to the present disclosure, the autonomous driving control apparatus 300 may perform a control operation to track the behavior corresponding to a required input value "a_req" required to the real vehicle by applying, to the initial input value "a_raw", three parameters, which is the controller correcting parameter $P_{hw}$, the trailer correcting parameter $P_{trail}$, and the driving context correcting parameter $P_{env}$, calculated by the control parameter application part 330 and correcting the initial input value "a_raw" as in following equation 1.

$$a\_req = a\_raw(P_{hw} + P_{trail} + P_{env})$$ Equation 1

In addition, according to the present disclosure, the autonomous driving accident may be previously prevented through the strategy to optimize the longitudinal control tracking performance.

In addition, the present disclosure may provide a method and an apparatus for controlling autonomous driving, capable of improving the autonomous driving performance in level 3.

In addition, according to the present disclosure, the longitudinal control correcting parameter is adaptively applied through the parameter mapping table based on various vehicle specifications and various driving contexts, thereby improving the longitudinal control tracking performance and minimizing maintenance cost.

The operations of the methods or algorithms described in connection with the processor embodiments disclosed in the present disclosure may be directly implemented with a hardware module, a software module, or the combinations thereof, executed by the processor. The software module may reside on a storage medium (that a memory and or a storage), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor. The processor may read out information from the storage medium and may write information in the storage medium. Alternatively, the storage medium may be integrated with the processor. The processor and storage medium may reside in an application specific integrated circuit (ASIC). The ASIC may reside in a user terminal. Alternatively, the processor and the storage medium may reside as separate components of the terminal of the user.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A method for controlling an autonomous driving for an autonomous driving vehicle, the method comprising:
    collecting sensing information on the autonomous driving in an autonomous driving mode;
    calculating an initial longitudinal control value based on the sensing information; correcting the initial longitudinal control value based on the sensing information; and
    performing a longitudinal driving control by transmitting the corrected initial longitudinal control value to a lower controller,
    wherein the correcting of the initial longitudinal control value based on the sensing information includes:
    activating a controller correcting parameter based on an input or output error of the lower controller;
    determining a trailer correcting parameter based on a specification of a trailer of the autonomous driving vehicle; and
    determining a driving context correcting parameter corresponding to a driving context.

2. The method of claim 1, wherein the activating of the controller correcting parameter based on the input or output error of the lower controller includes:
    measuring the input or output error;
    comparing between the input or output error and a critical error; and
    in response to comparing between the input or output error and the critical error, when the input or output error exceeds the critical error, activating the controller correcting parameter to maintain tracking performance to be within a range of the critical error.

3. The method of claim 1, wherein the determining of the trailer correcting parameter based on whether the trailer is attached to the autonomous driving vehicle includes:
    determining whether the trailer is attached by analyzing the sensing information on the autonomous driving;
    when it is determined that the trailer is attached, calculating the specification of the trailer based on the sensing information on the autonomous driving; and determining the trailer correcting parameter corresponding to the calculated specification of the trailer by referring to a trailer mapping table which is previously stored.

4. The method of claim 1, wherein the determining of the driving context correcting parameter corresponding to the driving context includes:
determining the driving context based on the sensing information on the autonomous driving;
determining whether application of a longitudinal control parameter is required with respect to the determined driving context; and
when it is determined that the application of the longitudinal control parameter is required, determining the driving context correcting parameter, which corresponds to a characteristic of the autonomous driving vehicle and the determined driving context, by referring to a driving context mapping table which is previously stored.

5. The method of claim 4, wherein the characteristic of the autonomous driving vehicle includes acceleration tracking performance for each vehicle speed based on slip and behavior limits.

6. The method of claim 1, wherein the correcting of the initial longitudinal control value includes:
calculating the corrected initial longitudinal control value by applying at least one of the controller correcting parameter, the trailer correcting parameter, or the driving context correcting parameter to the initial longitudinal control value.

7. The method of claim 1, wherein the sensing information on the autonomous driving includes at least one of positioning information, precision map information, camera capturing information, sensing information by a Radar or Lidar, weather information, driving speed information, information on a recognized driver gaze, sensing information on vehicle internal failure, information on a button input to release the autonomous driving, sensing information on an operation of a steering wheel, or sensing information on an operation of the acceleration or deceleration pedal.

8. An apparatus for controlling autonomous driving, the apparatus comprising:
a sensor configured to collect sensing information on autonomous driving in an autonomous driving mode;
a longitudinal control value generator configured to calculate an initial longitudinal control value based on the sensing information;
a longitudinal control parameter corrector configured to calculate the initial longitudinal control value based on the sensing information; and
a lower controller configured to control longitudinal driving by receiving the initial longitudinal control value,
wherein the longitudinal control parameter corrector comprises:
activating a controller correcting parameter based on an input or output error of the lower controller;
determining a trailer correcting parameter based on a specification of a trailer of the autonomous driving vehicle; and
determining a driving context correcting parameter corresponding to a driving context.

9. The apparatus of claim 8, wherein the longitudinal control parameter corrector further comprises:
an input or output error correcting part configured to activate a controller correcting parameter based on the input or output error of the lower controller.

10. The apparatus of claim 9, wherein the input or output error correcting part is configured to:
measure the input or output error between a required acceleration and an output acceleration for the lower controller;
compare between the input or output error and a critical error; and
activate the controller correcting parameter to maintain tracking performance to be within a range of the critical error when the input or output error exceeds the critical error.

11. The apparatus of claim 9, wherein the longitudinal control parameter corrector includes:
a first parameter correction part configured to determine the trailer correcting parameter based on whether a trailer is attached to the autonomous driving vehicle.

12. The apparatus of claim 11, wherein the first parameter correction part is configured to:
determine whether the trailer is attached by analyzing the sensing information on the autonomous driving;
calculate the specification of the trailer based on the sensing information on the autonomous driving when the trailer is attached; and
determine the trailer correcting parameter corresponding to the calculated specification of the trailer by referring to a trailer mapping table which is previously stored.

13. The apparatus of claim 11, wherein the longitudinal control parameter corrector includes:
a second parameter correction part configured to determine a driving context correcting parameter corresponding to the driving context.

14. The apparatus of claim 13, wherein the second parameter correction part is configured to:
determine the driving context based on the sensing information on the autonomous driving;
determine whether application of a longitudinal control parameter is required with respect to the determined driving context; and
when it is determined that the application of the longitudinal control parameter is required, determine the driving context correcting parameter, which corresponds to a characteristic of the autonomous driving vehicle and the determined driving context, by referring to a driving context mapping table which is previously stored.

15. The apparatus of claim 14, wherein the characteristic of the autonomous driving vehicle includes:
acceleration tracking performance for each vehicle speed based on slip and behavior limits.

16. The apparatus of claim 13, wherein the longitudinal control parameter corrector is configured to:
calculate the corrected initial longitudinal control value by applying at least one of the controller correcting parameter, the trailer correcting parameter, or the driving context correcting parameter to the initial longitudinal control value.

17. The apparatus of claim 8, wherein the sensing information on the autonomous driving includes:
at least one of positioning information, precision map information, camera capturing information, sensing information by a Radar or Lidar, weather information, driving speed information, information on a recognized driver gaze, sensing information on vehicle internal failure, information on a button input to release the autonomous driving, sensing information on an operation of a steering wheel, or sensing information on an operation of an acceleration or deceleration pedal.

\* \* \* \* \*